(12) United States Patent
Neil et al.

(10) Patent No.: US 7,481,963 B2
(45) Date of Patent: Jan. 27, 2009

(54) METHOD OF REDUCING MAGNESIUM LOSS DURING SINTERING OF ALUMINUM OXIDE ARTICLES

(75) Inventors: Jeffrey T. Neil, North Reading, MA (US); Victor E. Perez, Manchester, NH (US); Timothy J. Horton, Durham, NH (US)

(73) Assignee: Osram Sylvania Inc., Danvers, MA (US)

( * ) Notice: Subject to any disclaimer, the term of this patent is extended or adjusted under 35 U.S.C. 154(b) by 828 days.

(21) Appl. No.: 11/160,537

(22) Filed: Jun. 28, 2005

(65) Prior Publication Data

US 2005/0215416 A1 Sep. 29, 2005

(51) Int. Cl.
*C04B 35/48* (2006.01)

(52) U.S. Cl. .................. 264/651; 264/652; 264/681

(58) Field of Classification Search .......... 264/82, 264/681, 651, 652
See application file for complete search history.

(56) References Cited

U.S. PATENT DOCUMENTS

| | | | |
|---|---|---|---|
| 5,682,082 A * | 10/1997 | Wei et al. ............ | 313/636 |
| 5,744,905 A * | 4/1998 | Mehrotra et al. ........ | 313/491 |
| 5,780,377 A * | 7/1998 | Wajima et al. .......... | 501/152 |
| 7,297,646 B2 * | 11/2007 | Rosenflanz et al. ...... | 501/33 |
| 2004/0061443 A1 * | 4/2004 | Neil et al. ............ | 313/623 |
| 2005/0275142 A1 * | 12/2005 | Niimi ................. | 264/621 |
| 2006/0164017 A1 * | 7/2006 | Rintamaki et al. ....... | 313/640 |

FOREIGN PATENT DOCUMENTS

| | | | |
|---|---|---|---|
| EP | 1296355 A2 * | 3/2003 |
| JP | 61114458 A * | 6/1986 |
| JP | 63235458 A * | 9/1988 |
| JP | 63313451 A * | 12/1988 |
| JP | 07288103 A * | 10/1995 |
| JP | 11135075 A * | 5/1999 |

* cited by examiner

*Primary Examiner*—Carlos Lopez
(74) *Attorney, Agent, or Firm*—Robert F. Clark

(57) ABSTRACT

A method for reducing the loss of magnesium during the sintering of aluminum oxide articles, such as ceramic discharge vessels for lighting applications. Magnesium oxide is added to aluminum oxide articles to control grain growth during sintering, but the sintering causes magnesium loss from the article. In order to address this problem, one or more aluminum oxide articles that are enriched in magnesium oxide are added to the sintering furnace to stem the loss of magnesium oxide in the remaining articles. The enriched aluminum oxide article is made by soaking a porous aluminum oxide article in an aqueous solution of magnesium nitrate and heating the porous article to convert the magnesium nitrate to magnesium oxide. The enriched articles may then be added in one or several locations to the sintering furnace, where the magnesium from the enriched articles is released to suppress the magnesium loss.

16 Claims, No Drawings

METHOD OF REDUCING MAGNESIUM LOSS DURING SINTERING OF ALUMINUM OXIDE ARTICLES

BACKGROUND OF THE INVENTION

The present invention is directed to a method of making aluminum oxide articles, and more particularly to a method of reducing magnesium loss that occurs during sintering of an aluminum oxide discharge vessel for a high-intensity-discharge (HID) lamp.

HID lamps such as high-pressure-sodium (HPS) lamps and ceramic metal halide lamps generally employ a ceramic discharge vessel made of a translucent polycrystalline aluminum oxide (PCA) for arc generation and containment. These discharge vessels (e.g., arc tubes in HPS lamps) are fabricated from a relatively pure aluminum oxide (alumina) powder and are typically formed by sintering at temperatures over 1800° C. in a hydrogen atmosphere. These conditions lead to the high total light transmission in the sintered discharge vessels that is required for lighting applications.

High sintering temperatures will cause exaggerated grain growth and reduced material strength unless controlled. A method to control grain growth in aluminum oxide has been to add small amounts of magnesium oxide to the aluminum oxide. Typically, the amount of magnesium oxide ranges from 0.02 to 0.1 weight percent (wt %) of the aluminum oxide. Some of the added magnesium oxide leaves the ceramic during sintering through vaporization in the hydrogen sintering atmosphere.

Magnesium may also be lost during the operation of the lamp and has been linked to blackening of the outer jacket glass of high pressure sodium lamps. It is therefore desirable to use as little magnesium oxide as possible for maintaining control of grain growth. Experiments have shown that the use of 0.02 wt % magnesium oxide in the aluminum oxide is about the lowest level that can be processed successfully on a production scale without risking exaggerated grain growth. However, at this level localized exaggerated grain growth may occur unless another source of magnesium oxide is added to provide a greater partial pressure of magnesium in the furnace atmosphere. The additional magnesium reduces the loss of magnesium from the discharge vessels into the furnace atmosphere.

Prior attempts to reduce magnesium loss involved adding magnesium oxide powder to the sintering furnace, but this proved difficult to control. Some regions in the sintering furnace had excessive magnesium levels and other regions had too little. The powdered magnesium oxide would also adhere to molybdenum parts of the sintering furnace and create a rough surface contacting the discharge vessels.

A further method was developed to produce a granular powder enriched in magnesium oxide that provided better control of the magnesium release during sintering. The method added magnesium oxide to aluminum oxide powder at a level of 10 wt %. The process included mixing the powders in a concentrated nitric acid solution, followed by a slow drying and a prefiring process. The resulting material was then crushed into a powder that could be placed in several locations in the sintering furnace. This method was generally satisfactory, but required the handling of concentrated acid, a long drying time, and still left a powder buildup on the molybdenum sintering fixtures.

Accordingly, it is desirable to have an improved process for adding magnesium to the sintering furnace atmosphere to reduce the loss of magnesium that occurs during sintering of aluminum oxide articles.

SUMMARY OF THE INVENTION

An object of the present invention is to provide a novel method of adding magnesium to the sintering furnace atmosphere that avoids the problems of the prior art.

A further object of the present invention is to provide a method of making aluminum oxide articles in which a first aluminum oxide article is prepared that contains a first amount of magnesium oxide and a second aluminum oxide article is formed to include a second amount of magnesium oxide wherein the second amount is greater than the first amount. The first article and the second article are then placed in a sintering chamber and simultaneously sintered.

A yet further object of the present invention is to provide a novel method in which first aluminum oxide articles are prepared that each contains a first amount of magnesium oxide, a second aluminum oxide article is formed by treating one of the first articles separately from others of the first articles to increase an amount of magnesium oxide to a second amount greater than the first amount, and the first and second articles are simultaneously sintered in a sintering chamber.

Another object of the present invention is to provide the further improvement wherein the step of forming the second article includes adding magnesium nitrate to the one of the first articles that is form the second article and then heating the one of the first articles to increase an amount of magnesium oxide in the one of the first articles from the first amount to the second amount.

These and other objects and advantages of the invention will be apparent to those of skill in the art of the present invention after consideration of the following description of preferred embodiments.

DESCRIPTION OF PREFERRED EMBODIMENTS

One embodiment of the present invention is a method for reducing the loss of magnesium during the sintering of aluminum oxide articles, such as ceramic discharge vessel for lamps.

As explained above, magnesium oxide is added to aluminum oxide articles to control grain growth during sintering, but the sintering causes the magnesium oxide to dissipate. The present invention enriches at least one additional aluminum oxide article with more magnesium oxide than the remaining articles (the ones that will form the final product) and adds the enriched article(s) to the sintering furnace to stem the loss of magnesium oxide in the remaining articles.

The articles enriched in magnesium oxide preferably are made by soaking some of the aluminum oxide articles in an aqueous magnesium nitrate solution to enrich their magnesium content and heating the articles to convert the magnesium nitrate to magnesium oxide. The enriched articles are placed in the sintering furnace with the remaining articles, where the magnesium from the enriched articles is released to suppress the magnesium loss in the remaining articles.

The enriched articles are, in effect, sacrificial devices that are safer and easier to prepare and cleaner to use than the powder of the prior art. These improvements are achievable, at least in part, because of the use of the enriched articles. The enriched articles are easily soaked in a concentrated solution of magnesium nitrate and water that provides the source of magnesium. When prefired porous aluminum oxide articles, such as HPS arc tube sections, are soaked in this solution, the magnesium oxide level can be raised to about 5 wt %, compared to the 0.02 wt % in the articles before soaking. The resulting enriched articles can be handled routinely, distributed as needed in the sintering furnace and do not leave a residue on the molybdenum sintering fixtures.

By way of example, the articles enriched in magnesium oxide were prepared from sections of prefired, porous aluminum oxide tubes used in the fabrication of high pressure sodium arc tubes. These tubes are a preferred source for the enriched articles since they are made of the same material fabricated in large amounts during the production of the arc tubes. Indeed, the tubing used to form the enriched articles may be tubing that has defects and rejected after forming. The tubing may be cut into short sections of about 1 gram each in weight using a diamond saw.

The short sections are prefired in air at temperatures between 850° and 1200° C. to remove organic binders used in forming and to sinter the resulting powder compact enough to provide handling strength. The prefiring temperature did not influence the quality of the enriched tubing. The tube sections in their prefired state are relatively porous and capable of being impregnated by a magnesium-containing solution.

A highly concentrated solution of magnesium nitrate was prepared by adding 80 grams of magnesium nitrate to 20 grams of de-ionized water. Magnesium nitrate is highly soluble in water and solutions of very high concentration are easily prepared. The solution was covered and allowed to dissolve overnight. Other concentrations may be used as will be appreciated by those of skill in the art.

The tube sections were submerged in the prepared solution and allowed to sit for one minute. Vacuum impregnation of the solution into the prefired tube may also be used, but simple submerging results in a similar level of magnesium enrichment. After removal of the tube sections from the solution, they were dried overnight at about 75° C. in air to ensure that all water was removed. The tube sections were then placed in a ceramic container and fired in air at about 850° C. to convert the magnesium nitrate to magnesium oxide. Tube sections that were not fully dried tended to fracture during firing when the water quickly turned to steam.

By weighing the tube sections before soaking, after drying and after firing, it was determined that between 5 and 6 wt % magnesium oxide had been added. Recall that the tube sections contained about 0.02 wt % magnesium oxide before soaking. While the 5% is about half the 10% level used in the older powder method, the number of such sections to use is determinable because two grams of processed tubing sections may be added to the sintering containers for each 1 gram of older powder to achieve the same level of magnesium enrichment.

Sintering trials were made using the enriched tube sections and the prior art powder. The weight loss of the powder was compared to the weight loss of the tube sections to estimate the amount of magnesium released into the furnace atmosphere. Only a fraction of the magnesium in either method is released since both materials sinter themselves as the arc tubes are sintering and this sintering closes off pores and limits the release of magnesium. The powder showed a weight loss of about 1.8 to 1.9 percent. The enriched tube sections showed about 1.1 to 1.7 percent weight loss. Both systems demonstrated the ability to control exaggerated grain growth in conditions where low container loading of arc tubes would lead to exaggerated grain growth if no additional source of magnesium was added.

A further embodiment of the method includes the steps of preparing first aluminum oxide articles that each contains a first amount of magnesium oxide, forming a second aluminum oxide article by treating one of the first articles separately from others of the first articles to increase an amount of magnesium oxide to a second amount greater than the first amount, placing the first articles and the second article in a sintering chamber, and simultaneously sintering the first and second articles in the sintering chamber, thereby reducing an amount of magnesium lost from the first articles during the sintering of the first articles.

The step of forming the second aluminum oxide article by treating one of the first articles separately from others of the first articles may be accomplished by adding magnesium nitrate to the one of the first articles and then heating the one of the first articles to increase an amount of magnesium oxide in the one of the first articles from the first amount to the second amount. The magnesium nitrate may be added by soaking the one of the first articles in a highly concentrated aqueous solution of magnesium nitrate, e.g., greater than about 25 molal.

In this embodiment, the second amount preferably is at least an order of magnitude larger than the first amount, and more preferably the first amount of magnesium oxide is 0.02 to 0.1 wt % of the aluminum oxide and the second amount of magnesium oxide is 5 to 6 wt % of the aluminum oxide.

The one of the first articles that forms the second article may be one of the first articles that has been rejected as unsuited for its intended purpose, such as an arc tube that is unsuited for use in a lamp. Further, the one of the first articles that forms the second article may be a piece cut from one of the first articles.

The step of sintering the first and second articles in the sintering chamber may include the steps of determining a quantity of the second article needed to reduce an amount of magnesium lost from the first articles during the sintering of the first articles to an acceptable level and then distributing the determined quantity of the second article in the sintering chamber.

While embodiments of the present invention have been described in the foregoing specification, it is to be understood that the present invention is defined by the following claims when read in light of the specification.

What is claimed is:

1. A method of making an aluminum oxide article comprising the steps of:
   preparing a first aluminum oxide article that contains a first amount of magnesium oxide;
   forming a second aluminum oxide article to include a second amount of magnesium oxide wherein the second amount is greater than the first amount;
   placing the first article and the second article in a sintering chamber; and
   simultaneously sintering the first and second articles in the sintering chamber.

2. The method of claim 1, wherein the step of forming the second article comprises the steps of adding magnesium nitrate to a porous aluminum oxide article and then heating the porous article to convert the magnesium nitrate to magnesium oxide.

3. The method of claim 2, wherein the step of adding magnesium nitrate comprises the step of soaking the porous article in an aqueous solution of magnesium nitrate.

4. The method of claim 3, wherein the solution has a concentration greater than about 25 molal magnesium nitrate.

5. A method of making aluminum oxide articles comprising the steps of:
   preparing first aluminum oxide articles that each contains a first amount of magnesium oxide;
   forming a second aluminum oxide article by treating one of the first articles separately from others of the first articles to increase an amount of magnesium oxide to a second amount greater than the first amount;

placing the first articles and the second article in a sintering chamber; and simultaneously sintering the first and second articles in the sintering chamber.

6. The method of claim 5, wherein the step of forming the second article comprises the steps of adding magnesium nitrate to the one of the first articles and then heating the one of the first articles to increase an amount of magnesium oxide in the one of the first articles from the first amount to the second amount.

7. The method of claim 6, wherein the step of adding magnesium nitrate comprises the step of soaking the one of the first articles in an aqueous solution of magnesium nitrate.

8. The method of claim 7, wherein the solution has a concentration greater than about 25 molal magnesium nitrate.

9. The method of claim 5, wherein the second amount is at least an order of magnitude larger than the first amount.

10. The method of claim 9, wherein the first amount of magnesium oxide is 0.02 to 0.1 wt % of the aluminum oxide and the second amount of magnesium oxide is 5 to 6 wt % of the aluminum oxide.

11. The method of claim 5, wherein the first articles are tubes.

12. The method of claim 5, wherein the step of sintering the first and second articles in the sintering chamber comprises the steps of determining a quantity of the second article needed to reduce an amount of magnesium lost from the first articles during the sintering of the first articles to an acceptable level and then distributing the determined quantity of the second article in the sintering chamber.

13. A method of making aluminum oxide lamp discharge vessels for high-intensity-discharge lamps comprising the steps of:

placing first aluminum oxide discharge vessels that each contains a first amount of magnesium oxide in a sintering chamber;

placing a second aluminum oxide article that contains a second amount of magnesium oxide in the sintering chamber, the second amount being at least an order of magnitude larger than the first amount; and simultaneously sintering the first lamp envelopes and the second article in the sintering chamber.

14. The method of claim 13, further comprising the step of making the second article by adding magnesium nitrate to a piece of one of first discharge vessels and then heating the piece to increase an amount of magnesium oxide in the piece from the first amount to the second amount.

15. The method of claim 14, wherein the step of adding magnesium nitrate comprises the step of soaking the piece in a solution of water and magnesium nitrate.

16. The method of claim 13, wherein the first amount of magnesium oxide is 0.02 to 0.1 wt % of the aluminum oxide and the second amount of magnesium oxide is 5 to 6 wt % of the aluminum oxide.

* * * * *